(12) United States Patent
Zajc

(10) Patent No.: US 9,287,030 B2
(45) Date of Patent: Mar. 15, 2016

(54) MULTI GAP INDUCTOR CORE

(76) Inventor: Franc Zajc, Komenda (SL)

( * ) Notice: Subject to any disclaimer, the term of this patent is extended or adjusted under 35 U.S.C. 154(b) by 686 days.

(21) Appl. No.: 13/116,699

(22) Filed: May 26, 2011

(65) Prior Publication Data

US 2012/0299680 A1 Nov. 29, 2012

(51) Int. Cl.

| | |
|---|---|
| H01F 7/06 | (2006.01) |
| H01F 7/127 | (2006.01) |
| H02K 15/02 | (2006.01) |
| H02K 15/03 | (2006.01) |
| H01F 27/245 | (2006.01) |
| H01F 27/25 | (2006.01) |
| H01F 27/26 | (2006.01) |
| H01F 27/28 | (2006.01) |
| H01J 3/14 | (2006.01) |
| G11B 5/17 | (2006.01) |
| H01J 3/08 | (2006.01) |

(52) U.S. Cl.
CPC .................. *H01F 7/06* (2013.01); *H01F 7/127* (2013.01); *H01F 27/245* (2013.01); *H01F 27/25* (2013.01); *H01F 27/26* (2013.01); *H01F 27/263* (2013.01); *H01F 27/2828* (2013.01); *H01F 27/2847* (2013.01); *H01J 3/14* (2013.01); *H02K 15/024* (2013.01); *H02K 15/03* (2013.01); *G11B 5/17* (2013.01); *H01F 2027/2861* (2013.01); *H01J 3/08* (2013.01); *Y10T 29/4902* (2015.01); *Y10T 29/49075* (2015.01); *Y10T 29/49078* (2015.01); *Y10T 29/49126* (2015.01)

(58) Field of Classification Search
CPC ......... H01F 7/06; H01F 7/127; H01F 27/245; H01F 27/25; H01F 27/26; H01F 27/263; H01F 27/2828; H01F 27/2847; H01F 2027/2861; H02K 15/024; H02K 15/03; G11B 5/17; Y10T 29/4902; Y10T 29/49075; Y10T 29/49078; Y10T 29/49126; H01J 3/14; H01J 3/08
USPC ......... 29/602.1, 607, 609, 830; 336/196, 199, 336/200, 205
See application file for complete search history.

(56) References Cited

U.S. PATENT DOCUMENTS

| | | | | |
|---|---|---|---|---|
| 3,080,642 | A | * | 3/1963 | Woods et al. ............... 29/609 X |
| 3,834,013 | A | * | 9/1974 | Gerstle ..................... 29/609 X |
| 5,676,768 | A | | 10/1997 | Muraoka et al. |
| 5,895,544 | A | * | 4/1999 | Finn et al. .................. 336/196 X |
| 6,345,434 | B1 | * | 2/2002 | Anbo et al. ................. 29/602.1 |
| 6,873,239 | B2 | * | 3/2005 | Decristofaro et al. ..... 336/198 X |
| 6,931,713 | B2 | * | 8/2005 | Roshen ........................ 29/609 |
| 7,573,362 | B2 | | 8/2009 | Thiel et al. |
| 2002/0132136 | A1 | | 9/2002 | Roshen |
| 2009/0206971 | A1 | | 8/2009 | Yuasa et al. |

FOREIGN PATENT DOCUMENTS

| | | |
|---|---|---|
| DE | 10040415 | 1/2002 |
| EP | 2209128 | 7/2010 |

(Continued)

*Primary Examiner* — A. Dexter Tugbang
(74) *Attorney, Agent, or Firm* — Occhiuti & Rohlicek LLP

(57) ABSTRACT

A multi-gap inductor core includes magnetic lamination sheets made of magnetic core material arranged in a stack, and fixing layers made of a fixing material. Each fixing layer is arranged between a corresponding pair of adjacent magnetic lamination sheets. Each fixing layer also includes an embedded mechanical spacer that defines a gap having a predetermined thickness between a corresponding pair of adjacent magnetic lamination sheets.

11 Claims, 9 Drawing Sheets

(56) References Cited

FOREIGN PATENT DOCUMENTS

| | | | |
|---|---|---|---|
| GB | 1562276 | 3/1980 | |
| GB | 2037089 | 7/1980 | |
| JP | 56137607 A | * 10/1981 | ............... 29/602.1 |
| WO | 2007/136288 | 11/2007 | |

* cited by examiner

MULTI GAP INDUCTOR CORE

FIELD OF INVENTION

This invention relates to a multi-gap inductor core, a multi gap inductor, especially for high-frequency (HF) applications, a transformer, and a corresponding manufacturing method and winding.

BACKGROUND

U.S. Pat. No. 7,573,362 discloses a high-current, multiple air gap, conduction-cooled, stacked lamination inductor. The magnetic core section of this known inductor includes substantially rectangular profiled magnetic laminations arranged in a stack.

Generally, in order to reduce the size of power electronics devices, converters are designed to use working frequencies that, for small power converters up to 10 V, have risen into the MHz range. There continues to be research on designing middle-power converters, up to 200V, and high-power converters, up to 500V, that can operate at frequencies in the range of 300 kHz up to 1 MHz.

In such converters, the inductor presents an important part regarding the losses and the size. Particularly, the inductor's size should be minimal. If possible, the inductor shape should be square and the inductor should have the lowest possible AC/DC resistance ratio at the desired working frequency. In existing inductors used at high frequencies, the skin effect, proximity effect, and fringing effect all contribute to comparatively high losses and correspondingly required large size.

In order to obtain the smallest possible inductor with a low DC resistance, the most known switching-converter inductors are wound with a circular or square wire on different shape ferrite cores with one or two air gaps. Better results are reached with inductors having their winding enclosed in a powdered material that, due to low permeability, replaces the air gap.

Relatively good results are achieved by the prior art inductor shown in FIG. 14, where TC denotes a toroidal ferrite core with an air gap AG and having strand wire SW wound around the core TC. These prior art inductors show a favorable AC/DC current resistance ratio. However, their field radiation is high, they are physically quite large, and their shape is inconvenient for fixing on a circuit board.

High-frequency current in circular or square-shape free wires is conducted only on the wire's surface. As a result of this phenomenon, which is known as the "skin effect," known inductors that have been wound with such wires have a resistance that varies dramatically with increasing frequency. The resulting high-frequency losses make these known inductors only useful for low alternating current frequencies.

The air gap also contributes to an increase the high-frequency losses. The magnetic flux exits the core in the area of the air gap and enters the winding, causing heating of the winding. Even the replacement of a single air gap by plural air gaps does not reduce the effect of this heating phenomenon very much at high frequencies. Although the effect can be completely eliminated by using a composite ferrite material as a core material, the permeability of a corresponding inductor depends very much on the magnetic density. Moreover, the composite ferrite material has a much lower saturation level than the sintered ferrite material. This means that the inductivity of such composite ferrite material inductors varies drastically with current changes.

SUMMARY

According to one aspect of the invention, the multi-gap core prevents the flux scattering out of the gap. The laminations are connected to each other with respective hardened fixing layers. Spacer means are embedded in the fixing layers to control the respective gaps. High viscous glue mixed with spherical particles as distance balls can be used as fixing layer.

The spherical particles can very accurately define the thickness of the gap between adjacent laminations if their diameter distribution is in a narrow range, i.e. 20 μm±2 μm. Such diameter distributions may, for example, be obtained with filtered carbon particles. Moreover, spherical distance balls are well suited to providing a monolayer as a homogeneous spacer means. In another aspect of the invention, pre-patterned bumps are used as homogeneous spacer means.

In a further aspect of the invention, the magnetic lamination sheets have a thickness between 0.1 and 1 mm and/or the predetermined gap thickness is between 10 and 100 μm.

The invention is well suited for high ripple current applications at high frequencies.

BRIEF DESCRIPTION OF THE DRAWINGS

The following embodiments of the invention will be described with reference to the drawings, wherein.

Throughout the figures, the same reference signs denote same or equivalent parts.

DETAILED DESCRIPTION

Figure 1:
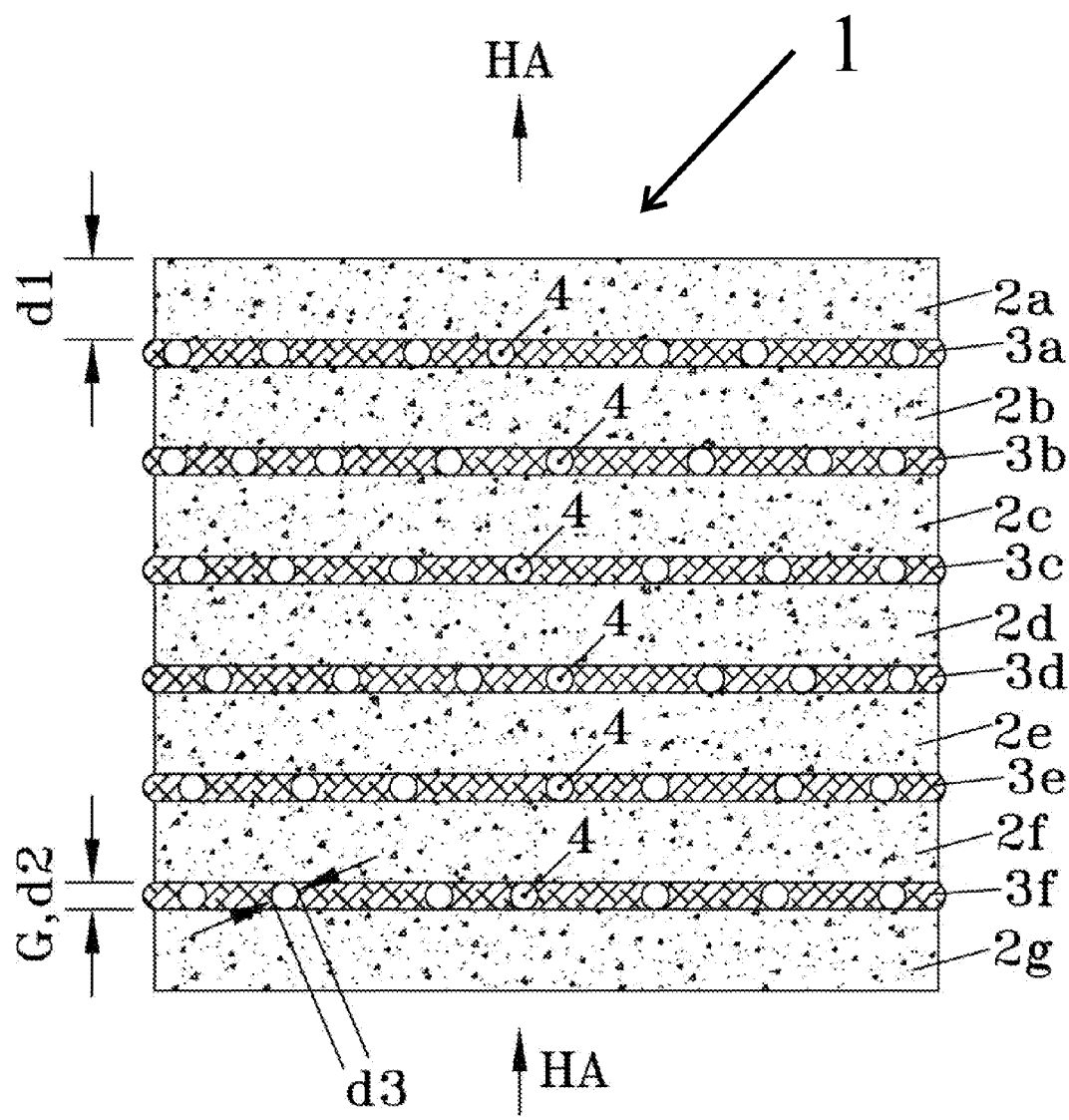
FIG. 1 shows a cross-section of a multi gap inductor core according to an embodiment of the present invention.

FIG. 1 shows a cross-section of a multi-gap inductor core according to an embodiment of the present invention.

In FIG. 1, reference sign 1 denotes a multi-gap inductor core according an embodiment of the present invention. The core 1 includes a plurality of seven magnetic lamination sheets 2a-2g made of a ferrite material with the lowest possible losses for the desired frequency range. Reference sign HA denotes a length axis of the core 1, i.e. along the staggering direction of the laminations 2a-2g.

If, for example, the 1 MHz frequency range is desired, an appropriate ferrite material would be that sold under the mark FERROXCUBE® 3F45. By presently known cutting methods, a minimum lamination thickness d1 of about 0.2 mm can be reached, allowing the permeability to be low and to have a good gap distribution.

Between corresponding pairs of adjacent magnetic laminations there is provided a corresponding hardened non-magnetic and non-conducting glue layer 3a-3f. Each glue layer 3a-3f includes a spacer means 4 in the form of spherical particles made of carbon, so-called glassy carbon spherical powder, which define a gap G having a predetermined thickness d2 between each corresponding pair of magnetic lamination sheets 2a-2g. Since a narrow size diameter distribution can be obtained by filtering such carbon material, the diameter d3 of the carbon particles 4 substantially equals the predetermined thickness d2 of the gap G. In other words, there is a monolayer of carbon particles included in the hardened glue layers 3a-3f acting as the mechanical spacer means. Only a few carbon particles per $mm^2$ are sufficient to ensure a very homogeneous gap G. The carbon particles are also non-magnetic and poorly conductive and solid, even at the temperature that develops in the glue during a hardening step, e.g. 180° C. Specifically, the spacer particles do not influence the magnetic flux and do not produce any disturbing heating effect.

The core 1 according to the embodiment of FIG. 1 allows the production of an inductor having excellent performance and comparatively low losses in the desired frequency range, which in this case is 1 MHz. The total gap of the core of FIG. 1 is the sum of all gaps G from where the magnetic field is dissipated only in a very small area causing no additional losses in the winding. The winding therefore can take the space very close to the core 1.

Figure 2:
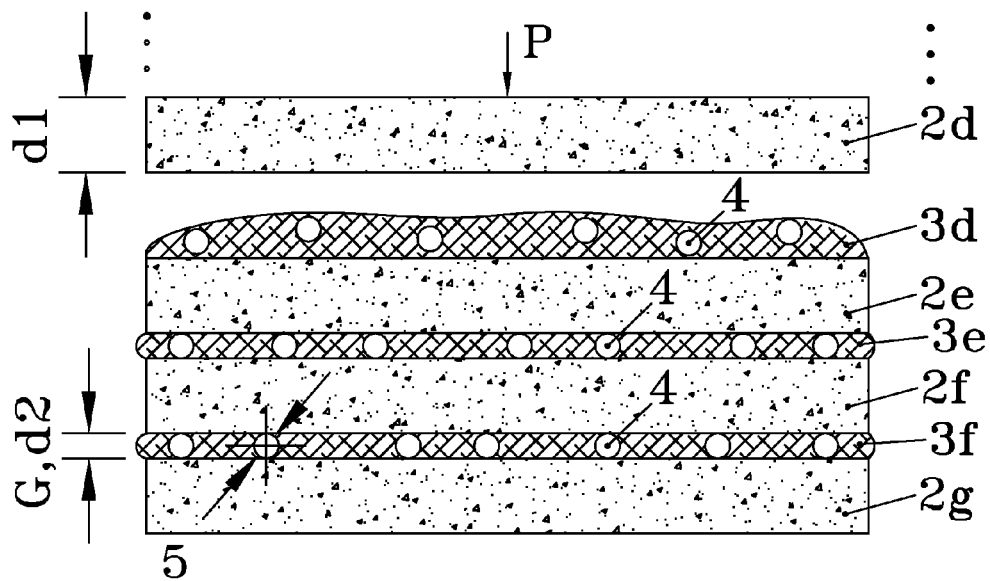
FIG. 2 shows a cross-section of a multi gap inductor core according to the first embodiment of the present invention in order to explain a corresponding manufacturing method thereof.

FIG. 2 shows a cross-section of a multi-gap inductor core according to the first embodiment of the present invention in order to explain a corresponding manufacturing method thereof.

As depicted in FIG. 2 a desired number of magnetic lamination sheets 2a-2g is stacked on top of each other. Between pairs of adjacent magnetic lamination sheets, the glue layers 3a-3f are dispensed by appropriate dispensing means. The glue layer is a premix of glue and the spherical carbon particles 4.

In order to obtain a favorable concentration of particles per $mm^2$, the concentration of the particles in the glue is typically between 0.1% and 3%, and preferably 1%. If the volume concentration is too high, there is a risk that the particles will stick together, making the gap thickness d2 inhomogeneous. On the other hand, if the volume concentration of the particles is too low, it will not be possible to assure that the particles are evenly distributed over the area between adjacent laminations. This too would make the thickness d2 inhomogeneous. Despite these lower and upper limitations, which can normally be found very easily by experiments, the range of applicable concentrations remains broad.

When the stack having the desired number of laminations 2a-2g and the intervening glue/spacer layers 3a-3f is completed, a pressure P is applied on the stack such that the spherical carbon particles 4 can exactly match and define the gap G with the predetermined thickness d2 according to their own diameters d3. Depending on the type of glue, e.g. epoxy glue, the hardening can then be performed at room temperature or at elevated temperatures, while the application of pressure P is continued until the stack is completely hardened.

Figure 3:
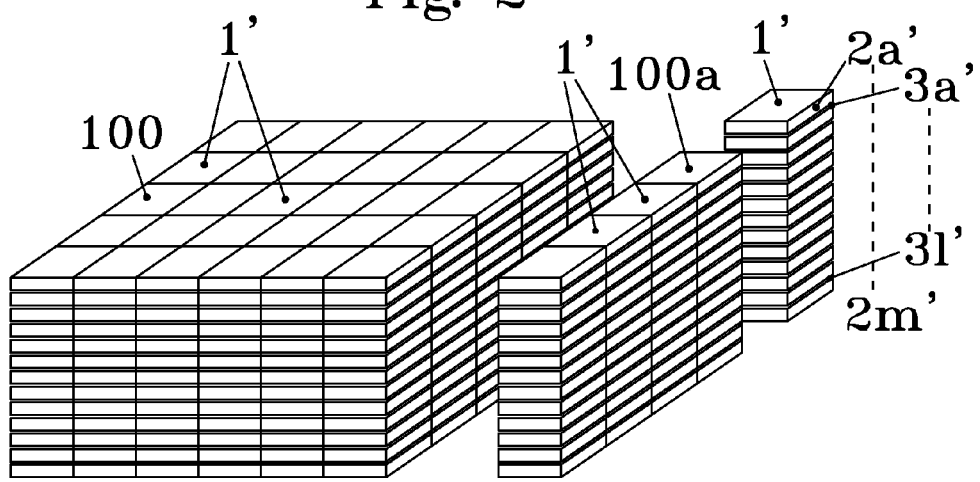
FIGS. 3 and 4 are perspective views in order to explain the step of separating individual multi gap inductor cores from the hardened stack manufactured as explained in FIG. 2.
Figure 4:
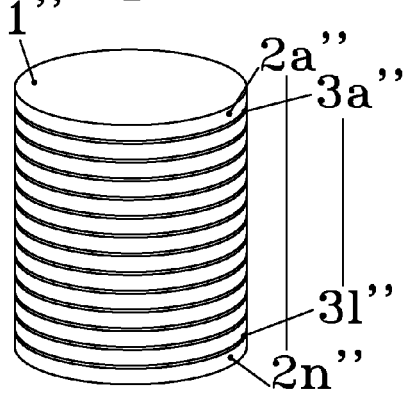

FIGS. 3 and 4 are perspective views in order to explain the step of separating individual multi-gap inductor cores from the hardened stack manufactured as explained in connection with FIG. 2.

It should be mentioned that, especially for small core diameters, the dimensions of the stack orthogonal to the length axis HA do not correspond to the dimensions of the finished core.

In the example of FIG. 2, the hardened stack 100 is 80 mm wide, 50 mm deep, and 25 mm long.

In order to provide individual cores 1', the hardened stack 100 is cut by a wafer saw (i.e. a diamond saw) or wire saw into rows 100a and then into the cores 1', where the laminations are labeled 2a'-2m' and the glue/spacer layers 3a'-3l'.

By using an appropriate sawing process, arbitrary core shapes may be obtained, for example, circular shapes as shown in FIG. 4 for the core 1" including laminations 2a"-2n" and glue/spacer layers 3a"-3l".

This manufacturing method allows an accuracy of typically 5% of the inductance value and very small gaps. In a further example, 1.3 mm of gap were distributed among sixty-five ferrite sheets. The tolerance accuracy can be improved by sorting out and assembling together two or more partial core stacks in order to provide air gaps with desired small tolerances.

Figure 5A:
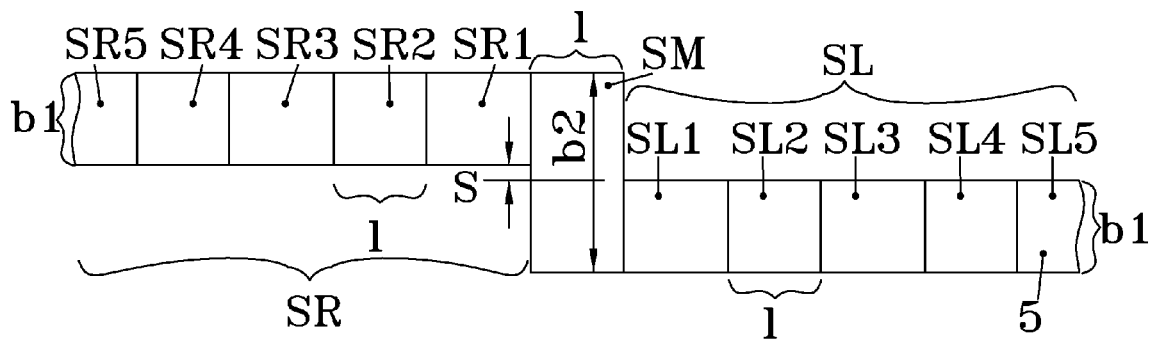
FIG. 5a is a plain view of a first example of an insulated conductive flat band used as a winding in connection with the multi gap inductor core according to the embodiments of the present invention.
Figure 5B:
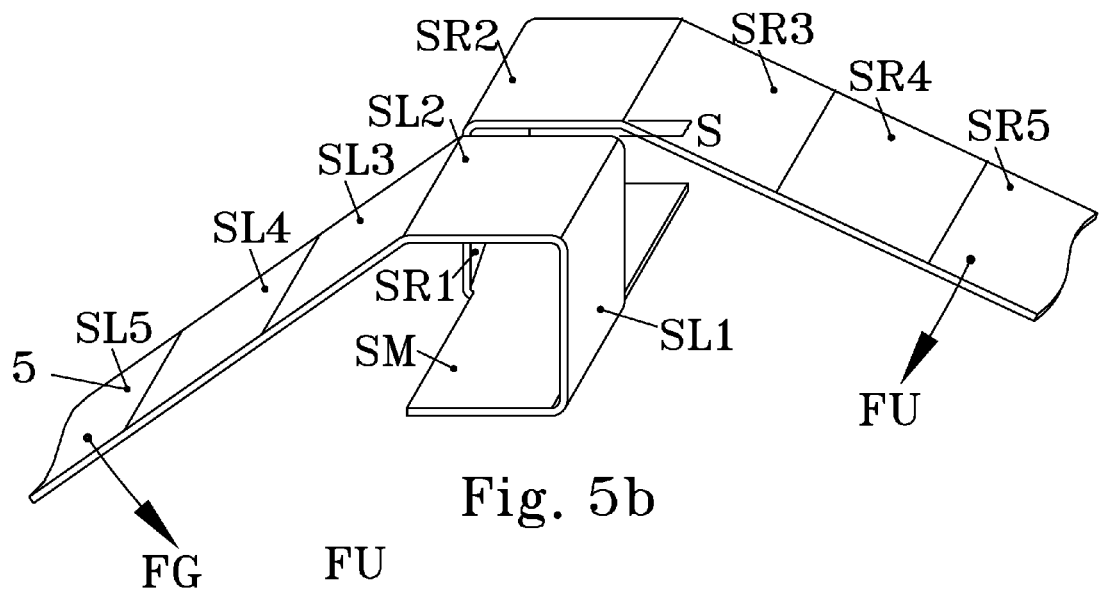
FIGS. 5b and 5c are perspective views of the insulated conductive flat band shown in FIG. 5a in order to illustrate a first winding procedure.
Figure 5C:
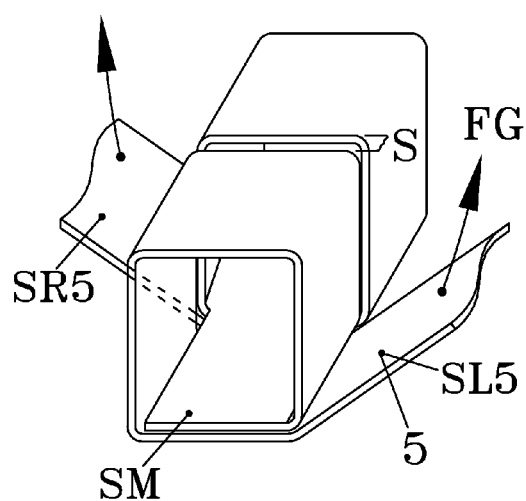

FIG. 5a is a plan view of a first example of an insulated conductive flat band (also sometimes denoted in the art as a strip) used as a winding in connection with the multi-gap inductor core according to the embodiments of the present invention; and FIGS. 5b and 5c are perspective views of the insulated conductive flat band shown in FIG. 5a in order to illustrate a first winding procedure.

The insulated conductive flat band 5 shown in FIGS. 5a-c is made of insulated conductive material such as copper or aluminum and includes a first linear region SR, a second linear region SL and a third linear region SM. The width b1 of the first linear region SR is equal to the width b1 of the second linear region SL, and the width b2 of the third linear region SM is 2×b1+S, where S is a given distance. This means that the first and second linear regions SR, SL are displaced by the distance S.

Moreover, the first and second linear regions SR, SL are orthogonally connected to the third linear region SM and run in anti-parallel directions as is apparent from FIG. 5a. Virtual segments SR1-SR5 of the first linear region SR having a length l are denoted in order to show the folding lines when winding the insulated conductive flat band 5 around a core according to an embodiment of the present invention occurs. Analogously, SL1-SL5 denote virtual segments of the second linear region SL, all of which have the length 1, which is a little bit larger than the diameter of the core to be used.

As is apparent from FIGS. 5b and 5c, the first linear region SR and the second linear region SL are wound in opposite directions FU (clockwise) and FG (counter-clockwise) around the third linear region SM in order to form the winding around the core of the embodiments of the present invention.

Figure 6:
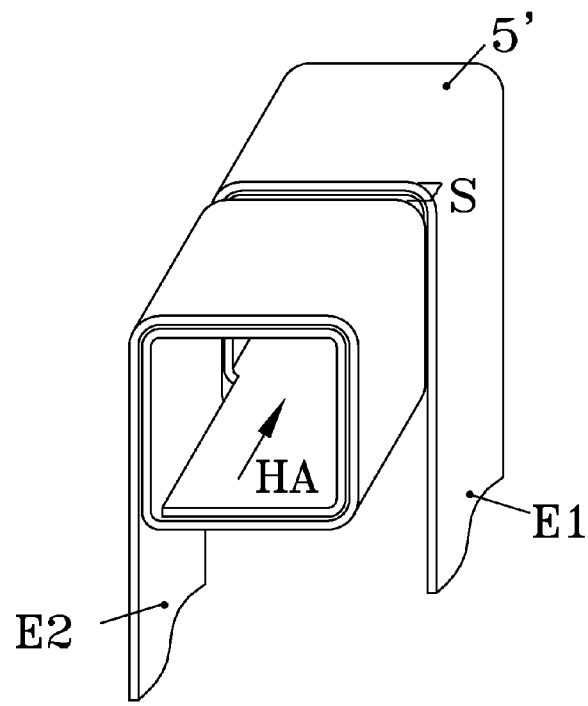
FIG. 6 is a perspective view of the first example of insulated conductive flat band used as a winding in connection with the multi gap inductor core according to the embodiments of the present invention after the first winding procedure is finished.

FIG. 6 is a perspective view of the first example of insulated conductive flat band used as a winding in connection with the multi-gap inductor core according to the embodiments of the present invention after the first winding procedure is finished.

A finished winding 5' made of an insulated conductive flat band as shown in FIGS. 5a-c is shown in FIG. 6. As depicted, it is preferred that the ends E1, E2 of the finished winding 5' be orthogonal to the length axis HA of the core to be inserted into the finished winding 5'.

Figure 7:
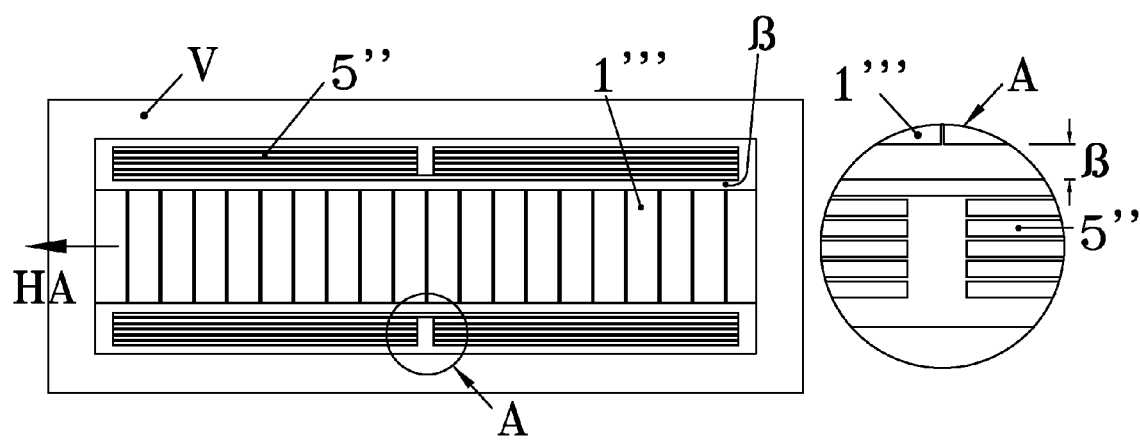
FIG. 7 shows a cross-section of a multi gap inductor having the winding type of FIG. 6 according to another embodiment of the present invention.

FIG. 7 shows a cross-section of a multi-gap inductor having the winding type of FIG. 6 according to another embodiment of the present invention.

The finished inductor of FIG. 7 includes a multi-gap core 1''' having twenty laminations with intervening glue/spacer layers as explained in connection with FIGS. 1 and 2 and having a surrounding winding 5'' in analogy to the winding 5' described with reference to FIG. 6, however, having a larger number of winding turns.

As is readily apparent from FIG. 7, the gap β between the core 1''' and the winding 5'' can be made very small. The section A of FIG. 7 is shown in enlarged form on the right-hand side of FIG. 7 and also shows the space s that corresponds to the distance S between the first and second linear regions SR, SL.

Reference sign V denotes a magnetic shielding that surrounds the inductor according to this embodiment and that closes the magnetic field of the coil.

Figure 8:
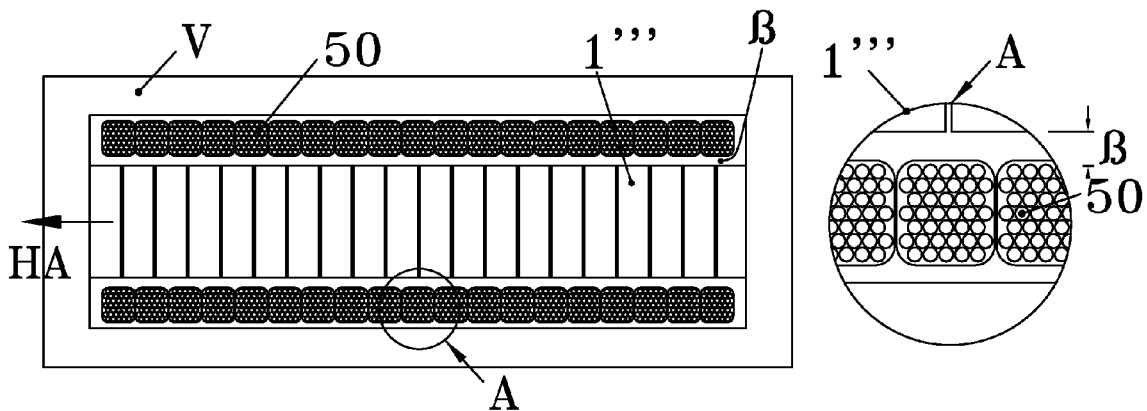
FIG. 8 shows a cross-section of a multi gap inductor having a strand wire winding type according to still another embodiment of the present invention.

FIG. 8 shows a cross-section of a multi-gap inductor having a strand wire winding type according to still another embodiment of the present invention.

In the embodiment shown in FIG. 8 the laminated core 1''' is surrounded by a strand wire 50. All further details are the same as described above with respect to FIG. 7.

Figure 9A:
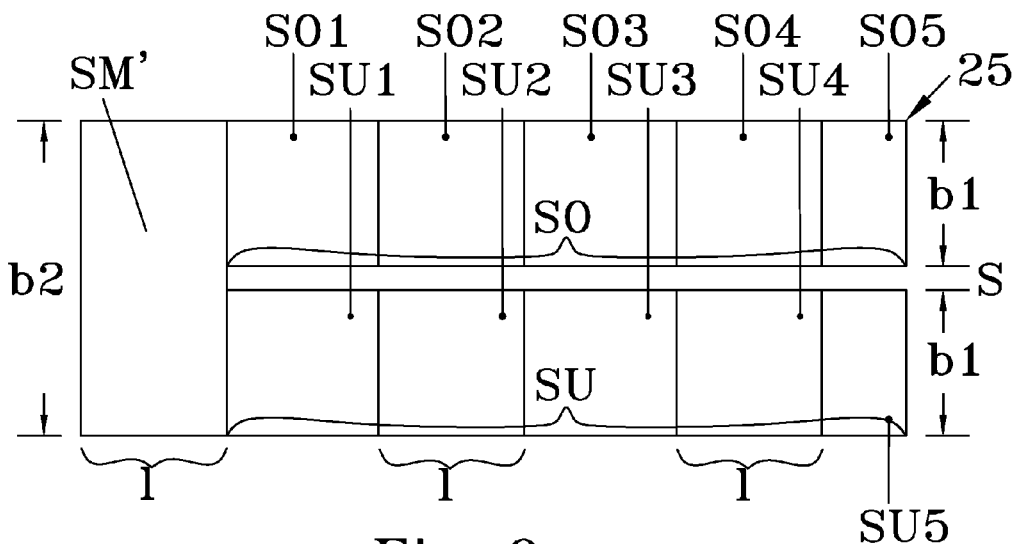
FIG. 9a is a plain view of a second example of an insulated conductive flat band used as a winding in connection with the multi gap inductor core according to the embodiments of the present invention.
Figure 9B:
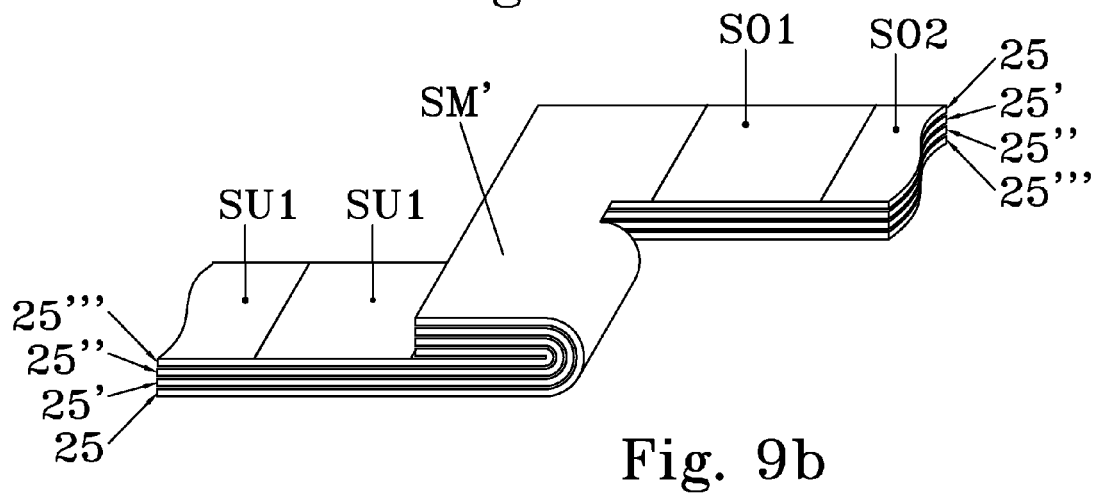
FIGS. 9b and 9c are perspective views of multiple parallel windings of the insulated conductive flat band shown in FIG. 9a in order to illustrate a second winding procedure.
Figure 9C:
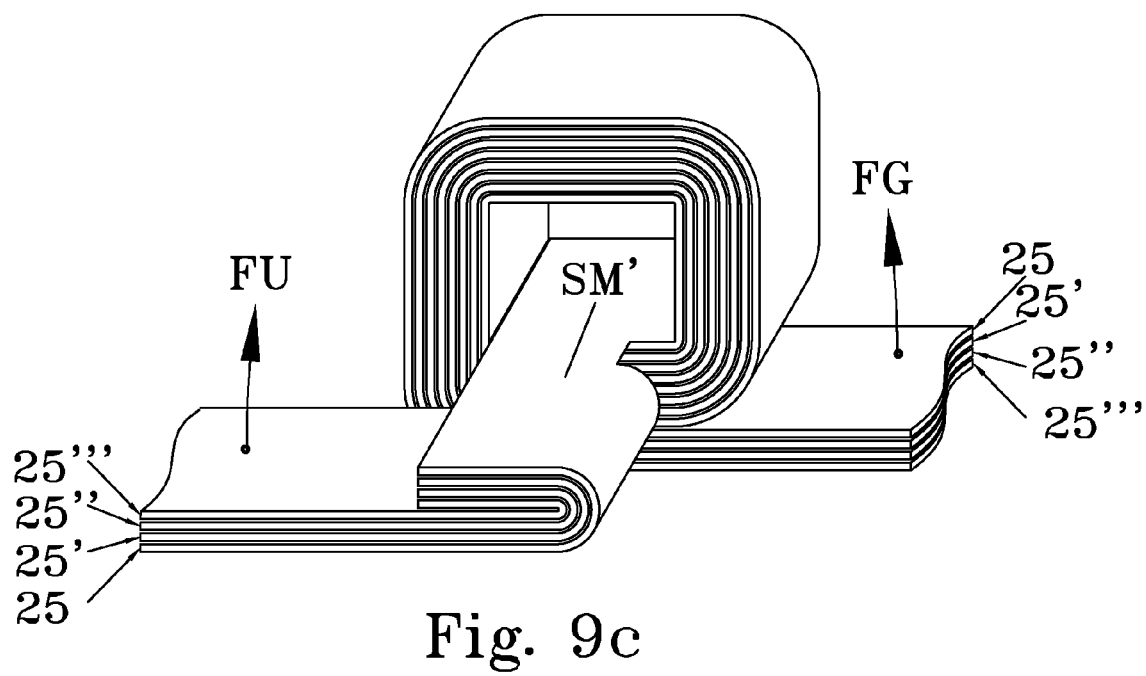

FIG. 9a is a plan view of a second example of an insulated conductive flat band used as a winding in connection with the multi-gap inductor core according to the embodiments of the present invention; and FIGS. 9b and 9c are perspective views of multiple parallel windings of the insulated conductive flat band shown in FIG. 9a in order to illustrate a second winding procedure.

The insulated conductive flat band 25 shown in FIG. 9a includes first linear region SU, a second linear region SO and a third linear region SM'. As in the example of FIG. 5a, the third linear region SM' is substantially orthogonally connected to the first linear region SU and to the second linear region SO, wherein the first linear region SU and the second linear region SO are displaced by a distance S, however, in contrast to the example in FIG. 5a run in parallel. The distance S arises from the difference of the width b2 of the third linear region SM' and the sum of the width b1 of the first and second linear regions SU, SO.

In these examples, virtual segments SU1-SU5 of the first linear region SU and virtual segments SO1-SO5 of the second linear region SO are depicted in order to clarify the folding lines when the insulated conductive flat band 25 of FIG. 9a is wound to form a winding around a core according to an embodiment of the present invention.

As shown in FIG. 9b, insulated conductive flat bands 25, 25', 25'', 25''' of the type shown in FIG. 9a are stacked on top of each other in isolation from each other. The isolation can be achieved by using a foil, e.g. a polyimide foil, such as KAPTON® foil, a resin, or a native or artificial oxide on the surface of the insulated conductive flat bands 25, 25', 25'', 25'''.

As is apparent from FIG. 9c, the stack of insulated conductive flat bands 25, 25', 25'', 25''' shown in FIG. 9b is then wound in opposite directions FU (clockwise) and FG (anti-clockwise) around the third linear regions of the insulated conductive flat bands 25, 25', 25'', 25''' in order to form the winding around a core according to an embodiment of the present invention.

Figure 10:
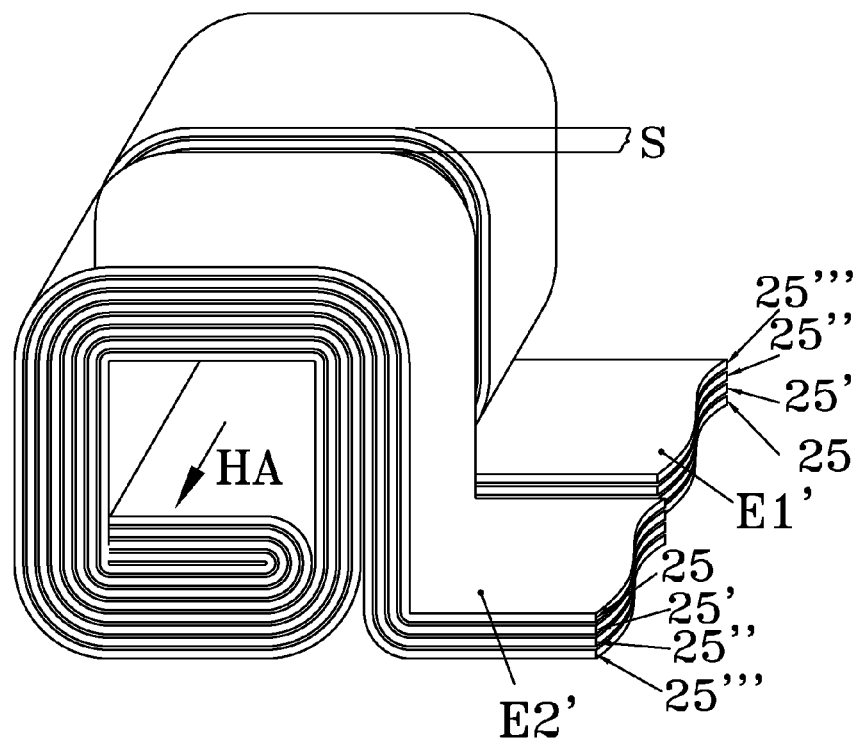
FIG. 10 is a perspective view of the second example of multiple parallel windings of insulated conductive flat band used as a winding in connection with the multi gap inductor core according to the embodiments of the present invention after the second winding procedure is finished.

FIG. 10 is a perspective view of the second example of multiple parallel windings of insulated conductive flat band used as a winding in connection with the multi-gap inductor core according to the embodiments of the present invention after the second winding procedure is finished.

In the final winding shape, shown in FIG. 10, the ends E1', E2' also bend orthogonal to the length axis HA of the core, in accordance with the embodiments of the present invention, to be inserted into the wound winding.

In the embodiment shown in FIG. 10, the outer flat band 25 on one side becomes the inner flat band on the other side when wound in opposite directions FU, FG. This contributes to counteract the proximity effect that otherwise would tend to shift the high-frequency current in the outermost flat band area. In particular, the stack sequence change equalizes the induced voltage along the bands in order to avoid a current along the bands.

Figure 11A:
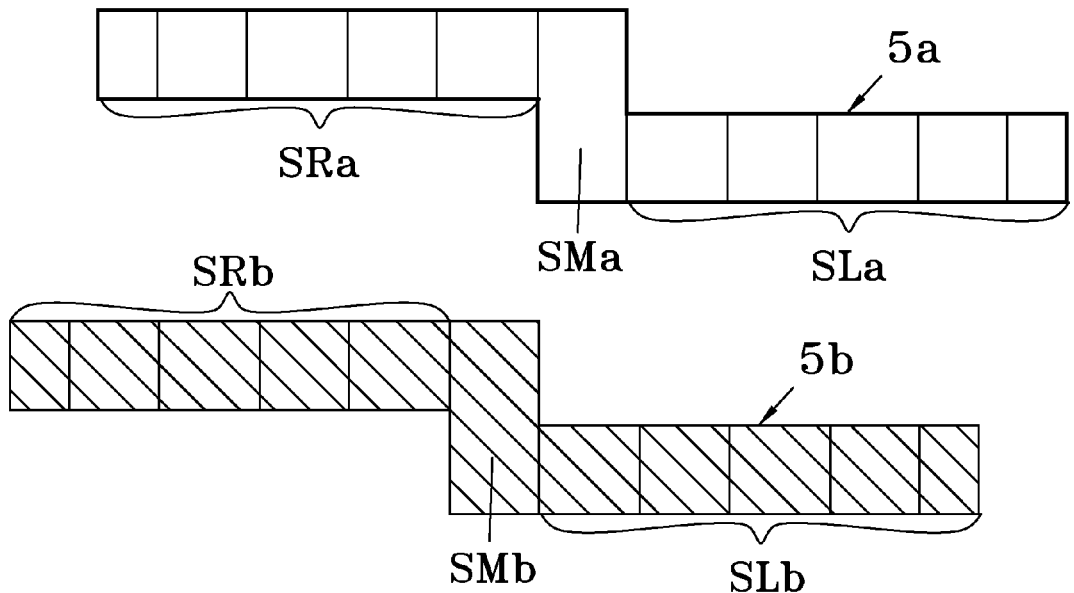
FIGS. 11a and 11b are plain views of the first example of insulated conductive flat bands in form of a first and second specially stacked flat bands used as a winding in connection with the multi gap inductor core according to the embodiments of the present invention.
Figure 11B:
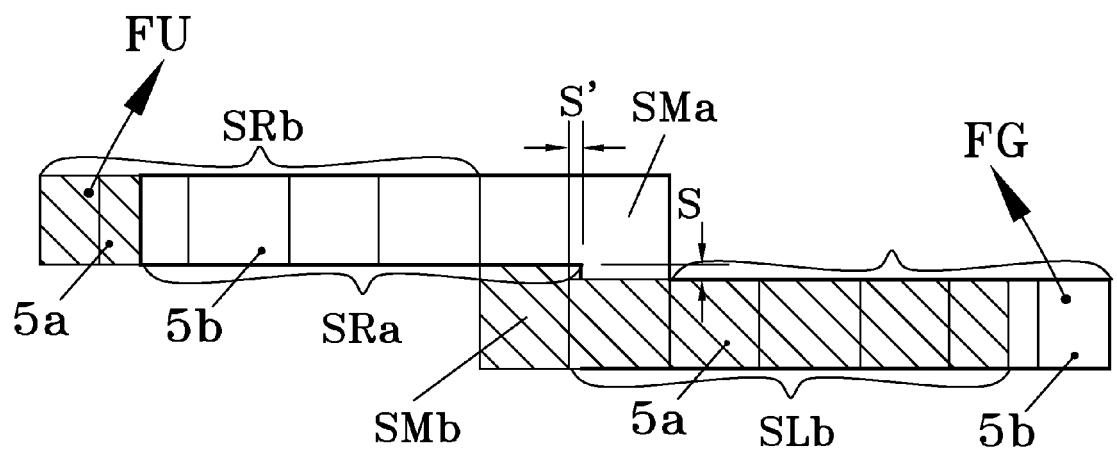

FIGS. 11a and 11b are plan views of the first example of insulated conductive flat band in form of a first and second specially stacked flat bands used as a winding in connection with the multi-gap inductor core according to the embodiments of the present invention.

In the embodiment shown in FIG. 11, a winding around a core in accordance with the embodiments described is made of two insulated conductive flat bands 5a, 5b of the type shown in FIG. 5a that are specially stacked on top of each other in an isolated manner.

In the insulated conductive flat bands 5a, 5b shown in FIG. 11a, SRa, SRb denote the corresponding first linear region of the first and second flat band 5a, 5b and SLa, SLb denote the corresponding second linear region of the flat bands 5a, 5b, whereas SMa and SMb correspond to a respective third linear region connecting the first and second linear regions of the flat bands 5a, 5b.

Before being wound, the insulated conductive flat bands 5a, 5b shown in FIG. 11a are stacked in isolation relative to each other such that there is a crossover that, on one side of the first linear region SRa of the first insulated conductive flat band 5a, lies above the first linear region SRb of the second insulated conductive flat band 5b, however, on the other side the second linear region SLa of the first insulated conductive flat band 5a lies below the second linear region SLb of the second insulated conductive flat band 5b. In the crossover region there is a small lateral gap S'×S between the insulated conductive flat bands 5a, 5b.

When winding the stacked arrangement of the first and second insulated conductive flat bands 5a, 5b, as shown in FIG. 11b, it also becomes possible, as was the case for the embodiment shown in FIG. 10, for the outer flat band on one side to become the inner flat band on the other side when wound in opposite directions FU, FG. This contributes to counteracting the proximity effect that otherwise would tend to shift the high-frequency current in the outermost flat band area.

Figure 12:
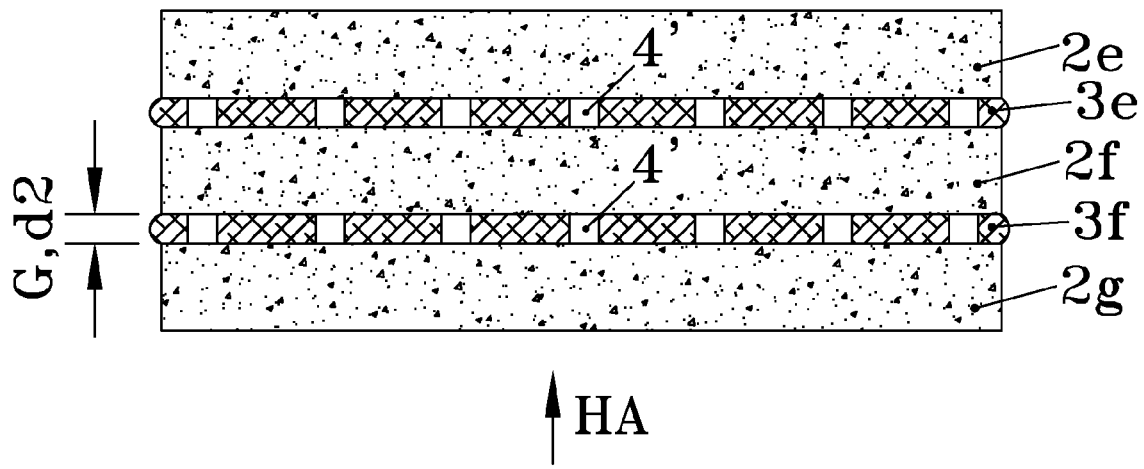
FIG. 12 shows a partial cross-section of a multi gap inductor core according to an embodiment of the present invention.

FIG. 12 shows a partial cross-section of a multi-gap inductor core according to an embodiment of the present invention.

In this embodiment, spacer means 4' includes a photolithographically structured $Al_2O_3$ layer having a plurality of cube shape bumps 4' between which the hardened fixing layers 3f etc. are provided. Here the fixing layer 3f is not made of glue but of adhesive wax.

Figure 13:
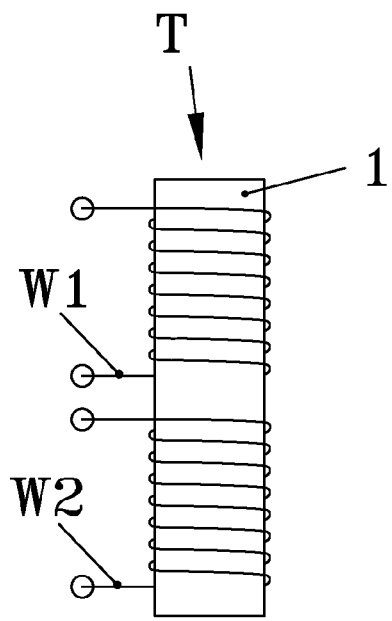
FIG. 13 shows a schematic view of a transformer including a multi gap inductor core according to an embodiment of the present invention.
Figure 14:
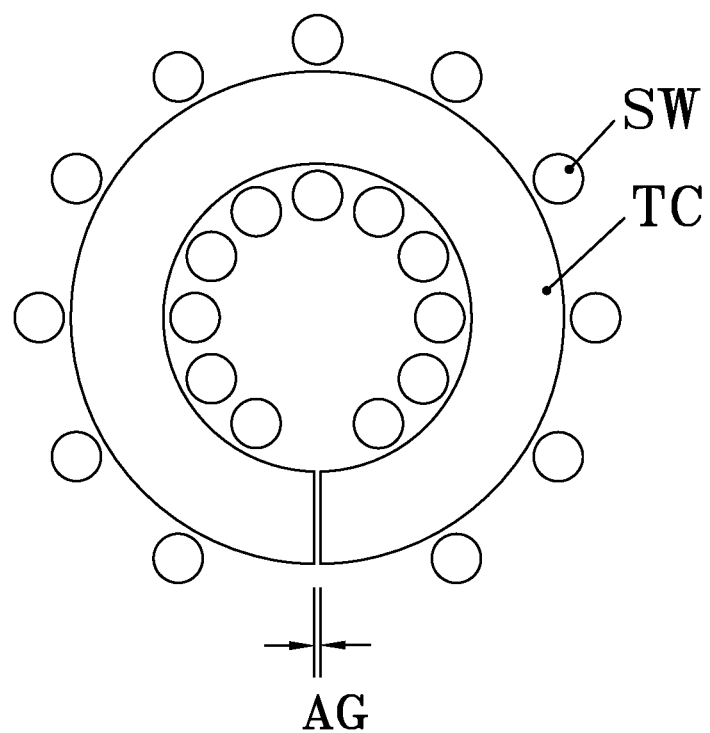
FIG. 14 shows an example of an inductor core according to the prior art.

FIG. 13 shows a schematic view of a transformer including a multi-gap inductor core according to an embodiment of the present invention.

In FIG. 13, reference sign 1 denotes a multi-gap inductor core according to the embodiment of the present invention shown in FIG. 1, and W1, W2 denote a primary and secondary winding wound around the core so as to form a transformer T.

Although the present invention has been described with reference to particularly embodiments, various modifications can be performed without departing from the scope of the present invention as defined in the independent claims.

In particular, the spacer means is not restricted to the specified carbon particles or $Al_2O_3$ bumps. Other materials, e.g. sand particles or quartz particles, or spacer foils or meshes may be used as well. Also, the shape of the particles or bumps is not restricted to being spherical or cubic. Various other shapes, such as other polyhedral forms, can also be used shape. However, it still is important that the diameter distribution be narrow enough to achieve the desired homogeneity of the gap thickness between the individual laminations.

Moreover, various materials can be used for the laminations, the fixing material and the windings. The invention is not restricted to the materials and dimensions mentioned hereinbefore. Further examples of the fixing material include TEFLON® (i.e. PTFE), resist, and grease that can be sufficiently hardened.

The invention claimed is:

1. A manufacture of a multi-gap inductor comprising:
a multi-gap inductor core, said multi-gap inductor core including: a plurality of magnetic lamination sheets made of magnetic core material arranged in a stack; and a plurality of fixing layers made of a fixing material; wherein each fixing layer is arranged between a corresponding pair of adjacent magnetic lamination sheets; and wherein each fixing layer includes an embedded mechanical spacer that defines a gap having a predetermined thickness between a corresponding pair of adjacent magnetic lamination sheets;
wherein a length axis of the multi-gap inductor core is defined along a staggering direction of the magnetic lamination sheets;
a winding formed of a flat band winding or a strand wire winding very closely wound around said multi-gap inductor core around said length axis of said multi-gap inductor core, whereby said flat band winding or strand wire and said multi-gap inductor core define a coil;
wherein the gaps are arranged perpendicular to a magnetic flux direction of said coil; and
wherein all of said gaps are surrounded by said winding; and
a magnetic shielding surrounding said coil and closing the magnetic field of the coil whereby said coil and said magnetic shielding define said multi-gap inductor.

2. The manufacture of claim 1, wherein said predetermined thickness of the gap being between 10 μm and 100 μm, and wherein said mechanical spacer comprises substantially spherical carbon particles having diameters that substantially equal said predetermined thickness.

3. The manufacture of claim 2, wherein said spherical carbon particles have a diameter distribution in the range of 20 μm plus or minus 2 μm.

4. The manufacture of claim 1, wherein said fixing material comprises glue.

5. The manufacture of claim 1, wherein said magnetic lamination sheets comprise ferromagnetic sheets.

6. The manufacture of claim 1, wherein said magnetic lamination sheets have a thickness between 0.1 mm and 1 mm.

7. The manufacture of claim 1, wherein said flat band winding includes at least one insulated conductive flat band having a first linear region, a second linear region, and a third linear region, wherein said third linear region is substantially orthogonally connected to said first linear region and to said second linear region such that said first linear region and said second linear region are separated by a distance and run anti-parallel, and wherein said first linear region and said second linear region are wound in opposite directions around said multi-gap inductor core and around said third region.

8. The manufacture of claim 7, wherein said flat band winding includes first and second insulated conductive flat bands stacked isolatedly on each other to define a crossover such that: on one side, said first linear region of said first insulated conductive flat band lies above said first linear region of said second insulated conductive flat band, and on said other side, said second linear region of said first insulated conductive flat band lies below said second linear region of said second insulated conductive flat band, wherein said stacked first and second insulated conductive flat bands are wound in opposite directions around said multi-gap inductor core.

9. The manufacture of claim 1, further comprising a flat band winding including at least one insulated conductive flat band having a first linear region, a second linear region, and a third linear region, wherein said third linear region is substantially orthogonally connected to said first linear region and to said second linear region such that said first linear region and said second linear region are separated by a distance and run in parallel, and wherein said first linear region and said second linear region are wound in opposite directions around said multi-gap inductor core and around said third region.

10. The manufacture of claim 9, wherein a plurality of said insulated conductive flat bands is stacked isolatedly on each other, and wherein said stacked plurality of said insulated conductive flat bands is wound in opposite directions around said multi-gap inductor core such that a stacking sequence is changed.

11. The manufacture of claim 1, further comprising a primary winding around said multi-gap inductor core; a secondary winding around said multi-gap inductor core; whereby said primary winding, said secondary winding, and said multi-gap inductor core cooperate to define a transformer.

* * * * *